INVENTOR.
ALEX J. BIELSKI

BY James and Franklin
ATTORNEYS

Nov. 24, 1964 A. J. BIELSKI 3,158,848

PRECISE MAGNETIC HEAD POSITIONING DEVICE
FOR A MEMORY DRUM ASSEMBLY

Filed Aug. 14, 1962 3 Sheets-Sheet 2

INVENTOR.
ALEX J. BIELSKI

BY [signature]

ATTORNEYS

INVENTOR.
ALEX J. BIELSKI
BY
Jameson & Franklin
ATTORNEYS

United States Patent Office
3,158,848
Patented Nov. 24, 1964

3,158,848
PRECISE MAGNETIC HEAD POSITIONING DEVICE FOR A MEMORY DRUM ASSEMBLY

Alex J. Bielski, Woodland Hills, Calif., assignor to General Instrument Corporation, Newark, N.J., a corporation of New Jersey
Filed Aug. 14, 1962, Ser. No. 216,894
7 Claims. (Cl. 340—174.1)

The present invention relates to the construction of a memory drum assembly, designed particularly to facilitate the assembly thereof and the mounting and precise positioning of the transducing heads used therewith.

Magnetic memory units comprise a traveling magnetizable recording medium moved past transducing heads, electrical connections being made to those heads so that they can be used either to record signals on the recording medium or reproduce signals previously recorded thereon. In a typical embodiment of such a device the recording medium is in the form of a continuously rotated drum having a large number of individual magnetic tracks thereon, a comparable number of transducing heads being mounted on the device for operative association with said tracks respectively. Since these devices are used for the storing of intelligence in a condition where each item of "remembered" or stored intelligence can be reproduced at will, one limiting factor in devices of this type is the number of items of intelligence which can be stored at a given time. Obviously, the greater the number of circumferential tracks on the magnetizable drum, the more information can be stored thereon. Each track can be used to store a number of items of information, provided that the relative position between said track and the transducing head associated therewith is accurately known, so that the desired item of information, and not some other item of information on the same track, can be reproduced upon command.

In a given installation there may be as many as one hundred sixty individual tracks on the recording medium, axially spaced from one another by only a fraction of an inch. There is at least one recording head for each track, and the circumferential position of that head must be precisely adjustable relative to the recording medium in order to provide for proper timing. If desired, a plurality of circumferentially spaced heads may be employed for some or all of the tracks. Thus devices of this type may have several hundred transducing heads mounted thereon, to each of which individual electrical connections must be made. The wiring complications inherent in such a system are obviously great. Moreover, each head must be so mounted that its circumferential position can be accurately adjusted. The importance of precise circumferential adjustment of these heads can be appreciated when it is realized that a drum having a circumferential length of 29 inches is rotated at 6000 r.p.m.

It is the prime object of the present invention to so construct a device of the general type under discussion as to facilitate the mounting and precise positioning of the multiplicity of transducing heads which are used therewith, to facilitate the making of electrical connections thereto, and to permit ready access to the interior of the device without disturbing the head adjustments or the wiring thereto.

In accordance with the present invention I utilize a magnetizable recording medium in the form of a drum rotated at high speed within an enclosing wall, as is relatively conventional. The wall is provided with a plurality of accurately located apertures extending therethrough, in which apertures the individual transducing heads are adapted to be received. The thus constituted transducing assembly is mounted on a support which carries terminal assemblies, preferably of the multiple contact type. Leads extend from individual contacts on those terminal assemblies to the individual recording heads, these leads being preferably guided and supported by suitable structure on the unit. For purposes of simplicity, the apertures in which the transducing heads are received are arranged in substantially axially aligned sets, each set being circumferentially spaced from adjacent sets, and a plurality of lead-guiding structures are provided, each being associated with, and appropriately positioned relative to, a plurality of said sets of apertures. In this way the internal wiring of the unit is accomplished and fixed as part of the assembly of the unit, and electrical connection to the large number of transducing heads is subsequently made conveniently and efficiently by the insertion and removal of conventional multiple contact connector devices cooperable with the terminal assemblies mounted on the memory unit itself.

The wall portion of the unit in which the head-receiving apertures are formed is preferably made in a plurality of separable sections, disassembly of those sections permitting access to the interior of the unit without having to disturb the heads carried by those sections, the adjustment of those heads on the sections, or the wiring to the heads.

Each of the head-receiving apertures is so shaped as to receive an individual transducing head and to permit that head to be circumferentially positionable therealong, thereby to permit each individual head to be accurately and precisely circumferentially positioned relative to the recording medium with which it cooperates. To this end each aperture is provided with a supporting surface, preferably tangentially oriented, the heads having parts received on and movable along said support surface. Means are provided for securing clamping the heads in adjusted position. As here specifically disclosed the support surfaces terminate laterally in undercut areas including an appropriately inclined wedging surface, wedging parts being carried by the heads, those wedging parts being manually movable into and out of wedging engagement with the inclined surfaces of the undercut areas. Means are provided for moving the wedging parts into and out of engagement with the inclined surfaces of the undercut areas, said means being accessible from the exterior of the device via the radially outer portions of the apertures in which the transducing heads are received.

To the accomplishment of the above, and to such other objects as may hereinafter appear, the present invention relates to the construction of a recording assembly such as a magnetic memory unit, as defined in the appended claims, and as described in this specification, taken together with the accompanying drawings, in which:

Figures 1, 2:
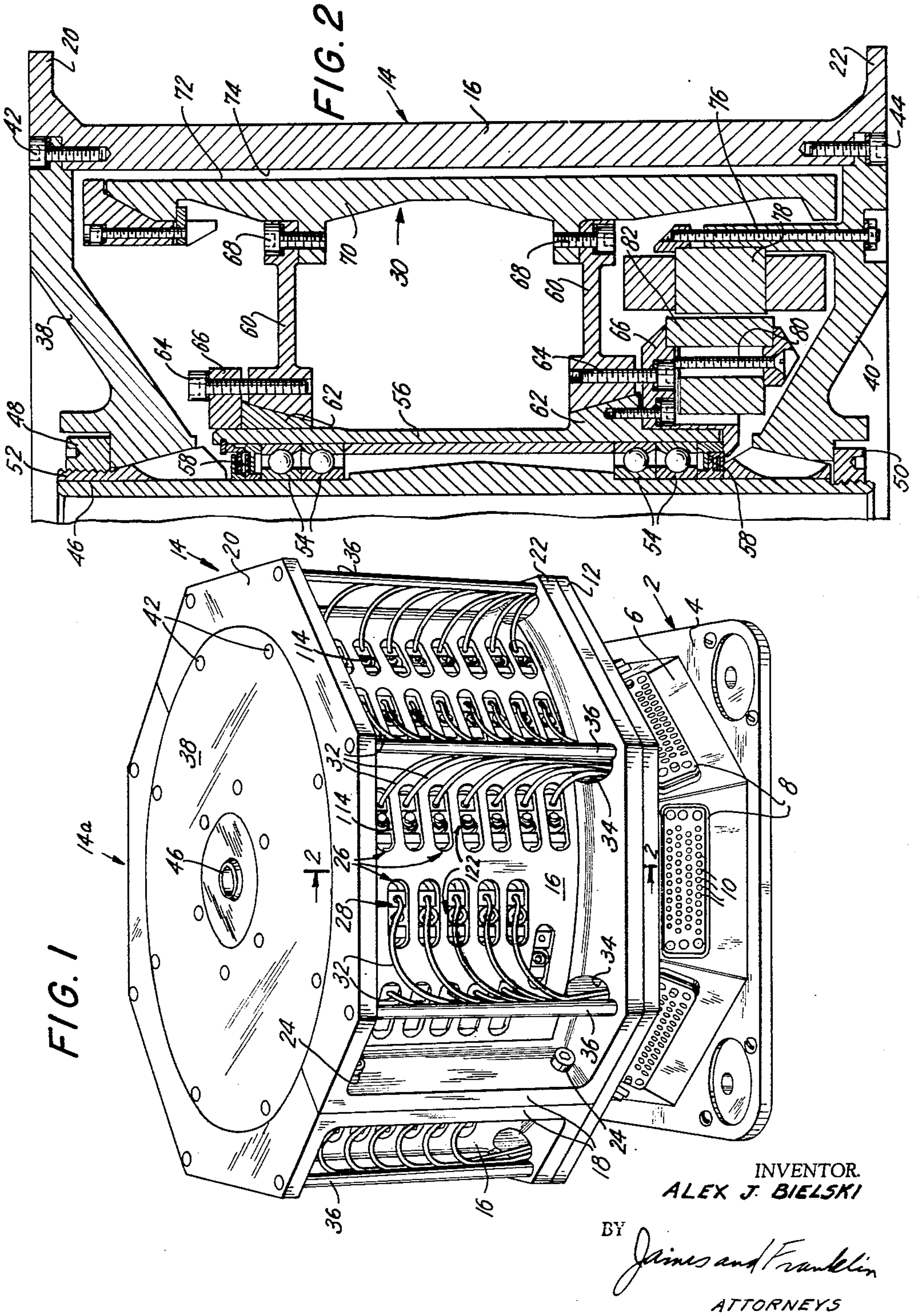
FIG. 1 is a three-quarter perspective of one embodiment of the present invention.
FIG. 2 is a partial cross sectional view thereof taken along the line 2—2 of FIG. 1.

Having reference first to FIGS. 1 and 2, the recording assembly comprises a support generally designated 2 having a bottom wall 4 and an upstanding pedestal-like portion 6 which carries a plurality of multiple connector terminal assemblies 8 of conventional construction, these terminal assemblies being shown as of the female type and adapted to cooperate with corresponding separable male connector units, each of the assemblies 8 having a plurality of individual contacts 10. A top wall 12 completes the support 2.

Mounted on the top plate 12 are a pair of housing sections 14 and **14*a*, each of those sections comprising a generally cylindrical wall 16 with abutting outwardly extending end flanges 18 and with outwardly extending top and bottom flanges 20 and 22. The end flanges 18 are adapted to be releasably secured together in any appropriate manner, as by means of the screws 24, and the bottom flanges 22 are adapted to be secured to the top pedestal wall 12 in any appropriate manner, as by means of screws (not visible in the drawings) extending up through the wall 12 and entering tapped apertures in the flanges 22. The walls 16 are provided with a plurality of apertures generally designated 26 in each of which individual transducing heads, generally designated 28, are adapted to be mounted by means hereinafter to be described. These apertures 26 are preferably arranged in substantially axially aligned sets of apertures, the apertures of each set being axially spaced from one another and each set of apertures being circumferentially spaced from adjacent sets of apertures. The apertures 26, or at least some of them, assume different axial positions on the walls 16 so as to cooperate with differently axially positioned recording tracks on the magnetizable recording medium, generally designated 30 (see FIG. 2), which is mounted inside the walls 16 and is adapted to be rotated relative thereto. If desired, some of the apertures 26 may have the same axial location but with different circumferential locations, so as to cooperate, at any given instant, with different circumferential portions of a given recording track on the recording medium 30. Leads 32 extend from the recording heads 28 to corresponding terminals 10 in the terminal assemblies 8, those leads 32 extending outwardly from the recording heads 28 and passing through apertures 34 formed in the bottom flanges 22 so as to enter the interior of the pedestal-like support portions 6, there to be connected to their respective contacts 10. A series of support rods 36 extend between the top and bottom flanges 20 and 22, preferably in line with the apertures 34, and the individual leads 32 are adapted to be led down from their respective transducing heads 28 to the apertures 34 along these rods 36, being removably secured thereto in any appropriate way, as through the use of adhesive strips. It is preferred that there be an aperture 34 and a supporting rod 36 for each pair of axially aligned sets of apertures 26, the apertures 34 and support rods 36 preferably being located between the adjacent sets of apertures 26** which they serve.

Top and bottom end bells 38 and 40 are secured to the upper and lower ends of the walls 16, as by screws 42 and 44 respectively. A stationary shaft 46 is supported by and extends between the end bells 38 and 40, being held in place by nuts 48 and 50 and by shaft cone 52. Bearings 54 rotatably mount shaft portion 56 on the shaft 46, labyrinth-type oil seals 58 being provided at the axial ends of the bearings 54. End plates 60 are secured to the shaft portion 56, being held on centering cones 62 by means of screws 64 and retaining collars 66, and those end plates 60 have secured thereto, as by screws 68, the magnetizable drum 70 which defines the recording medium 30, the outer surface 72 of the drum 70 being closely spaced relative to the inner surface 74 of the outer housing wall 16 and being accurately rotatively centered relative thereto. Fixed to the lower end bell 40, by screws 76, is the stator assembly 78 of an electric motor, and fixed to the lower end plate 60, by means of screws 80, is the rotor assembly 82 of the electric motor, which cooperates with the stator assembly 78. Thus, when the motor 78, 82, is energized the drum 70 will be driven in rotation relative to the housing wall 16.

The outer surface 72 of the drum 70 is formed of some suitable readily magnetizable and de-magnetizable material, such as a cobalt-nickel alloy.

Figures 3, 4, 5:
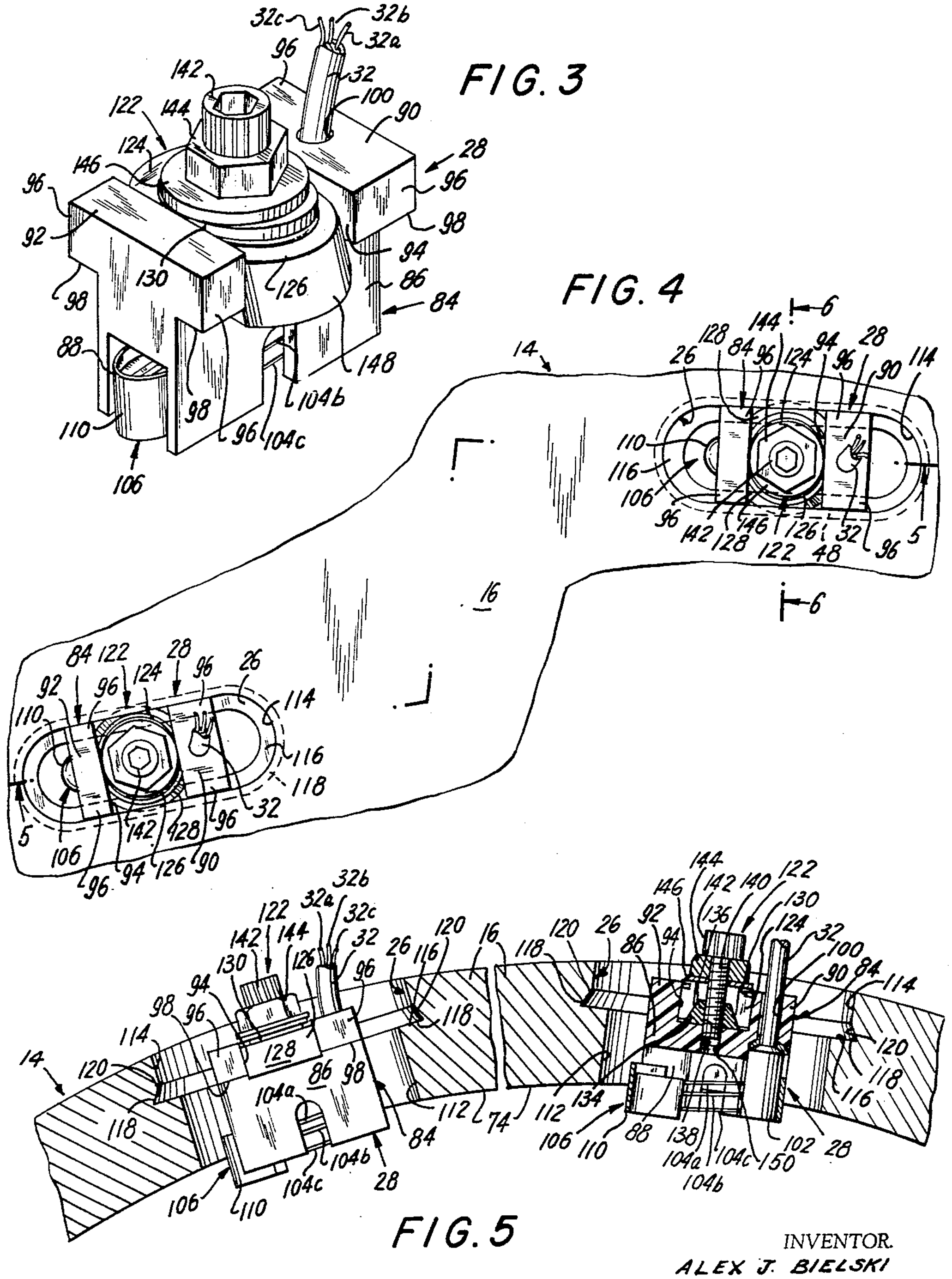
FIG. 3 is a three-quarter perspective view, on an enlarged scale, of an individual recording head together with the securing means associated therewith.
FIG. 4 is a fragmentary top plan view of a portion of the outer wall of the device, showing two transducer heads in position in their respective apertures.
FIG. 5 is a cross sectional view taken along the line 5—5 of FIG. 4, the right hand transducing head being cross-sectioned and the left hand transducing head being shown in side elevation.
Figure 8:
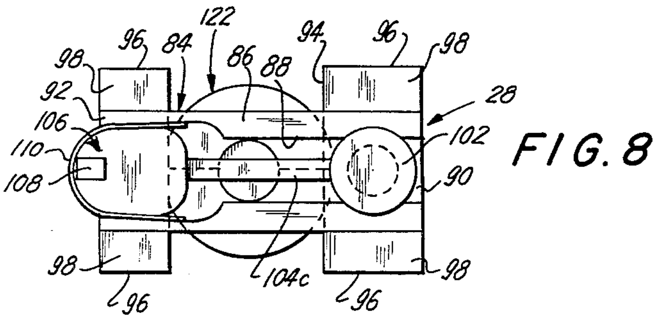
FIG. 8 is a bottom plan view of a typical transducing head.

The recording heads 28, as may best be seen from FIGS. 3 and 8, comprise a supporting body generally designated 84, formed of suitable molded insulating plastic material, comprising an elongated body portion 86 having a downwardly opening channel 88 formed in the lower surface thereof, and an upper portion defined by laterally outwardly extending sections 90 and 92 with a recess 94 therebetween. The portions 90 and 92 include laterally outwardly extending parts 96 having lower surfaces 98.

The lead 32 from the head 28 extends through an aperture 100 formed in the section 90, and passes down into the body portion 86 opposite the channel 88, where the three wires **32*a*, 32*b* and 32*c* of the lead 32 are electrically connected, within encapsulated portion 102, to a plurality of resilient conductive arms 104*a*, 104*b* and 104*c* respectively, those arms extending out freely along the channel 88 and carrying and resiliently supporting at their outer end an assembly 106 which may comprise the magnetizable part 108 exposed at the lower surface of the assembly 106, that part being operatively associated with suitable coil means within the assembly 106 and electrically connected to the conductive arms 104*a–c*, which serve as electrical connections thereto. The assembly 106 may be surrounded by a metallic protective shield 110. As will be understood, and is conventional, the magnetic part 108 is adapted to travel over a path on the external surface 72 of the drum 70** for magnetic transducing purposes.

The apertures 26 are formed with radially inner narrow portions 112 facing the drum 70 and with radially outer wider portions 114 facing the external periphery of the wall 16, ledges 116 being defined between the aperture sections 112 and 114. These ledges 116 are preferably flat and straight and extend longitudinally tangentially of an arc about the axis of rotation of the drum 70. At the sides of the ledges 116 undercut areas 118 are provided, the upper surfaces 120 thereof being outwardly and downwardly inclined. The width of the narrow aperture sections 112 is such as to permit the body portions 86 of the transducing heads to enter freely, but is narrower than the upper portions 90, 92 of the transducing head, whereas the upper sections 114 of the apertures 26 are sufficiently wide to permit the upper portions 90, 92 of the transducing heads 28 to enter. Thus the heads 28 may be inserted into the apertures 26 from the exterior of the walls 16, and when thus inserted the lower surfaces 98 of the laterally extending parts 96 will rest upon the ledge surfaces 116 of the apertures 26. When a transducing head 28 is thus received in an aperture 26, it will be so supported that the assembly 106 carried by the resilient arms **104*a–c* will be in the position shown in FIGS. 5, 6 and 7, with the exposed end of its magnetic part 108 adapted to resiliently engage the external surface 72 of the drum 70 as the latter is rotated. The length of the aperture sections 112 and 114 is greater than the length of the transducing head 28, and those aperture sections 112 and 114 are longitudinally oriented preferably parallel to the individual recording track on the drum 70 with which it is designed to be associated. Accordingly, the transducing head 28 is permitted a degree of longitudinal adjustable positioning movement along the aperture 26** in which it is received.

In order to releasably secure a given transducing head 28 in its desired position along the aperture 26 in which it is received, while at the same time permitting the head 28 to be removed from or inserted into the aperture 26 from the exterior of the wall 16, securing means generally designated 122 is employed, located in the recess 94 between the upper portions 90 and 92 of the head 28. As may perhaps best be seen in FIG. 7, it comprises a split cone element having two parts 124 and 126, each of those parts having outer surfaces 128 which are inclined downwardly and outwardly in a manner corresponding to the inclination of the surfaces 120 in the undercut portions 118 of the apertures 26. The two parts 124 and 126 are resiliently urged toward one another by a spring 130 received in peripheral grooves 132 formed in the parts 124 and 126, those parts having inner inclined surfaces 134 which are urged by the spring 130 into engagement with a cam 136 in the form of a cone having an internally threaded aperture 138. A screw 140 is threadedly received in the cone-cam 136, and the head 142 of that screw is accessible from the upper surface of the transducing head 28. A nut 144 is threadedly received on the screw 140, and a washer 146 is interposed between the nut 144 and the upper surfaces of the split cone parts 124 and 126.

When the screw 140 is, in effect, screwed out of the cone-cam 136, that cam 136 moves downwardly relative to the split cone parts 124 and 126, and those parts are moved toward one another by the spring 130, until their outer tips clear the undercut areas 118 in the apertures 126. With the split cone parts 124, 126 in this position the transducing head 28 may be inserted into the aperture 26 with which it is to be associated. The head 28 is then slid to its desired position along the length of the slit 26. The screw 140 is then screwed in, this having the effect of lifting the cone-cam 136 and forcing the split cone parts 124 and 126 outwardly, so that their outer portions enter the undercut aperture portions 118, their inclined outer surfaces 128 forcibly engaging the correspondingly inclined surfaces 120 of the undercut areas 118. This centers the head 28 widthwise of the aperture 26, and exerts a wedging action on the head 28, forcing it down into the aperture 26 until the lower surfaces 98 of its laterally extending parts 96 are clampingly pressed against the ledge surfaces 116 of the apertures 26, thereby firmly and reliably retaining the head 28 in adjusted position along the length of the aperture 26. Once it is certain that the proper adjusted position of the head 28 has been achieved, the nut 144 is screwed down, thus locking the securing means in secured condition.

Figures 6, 7:
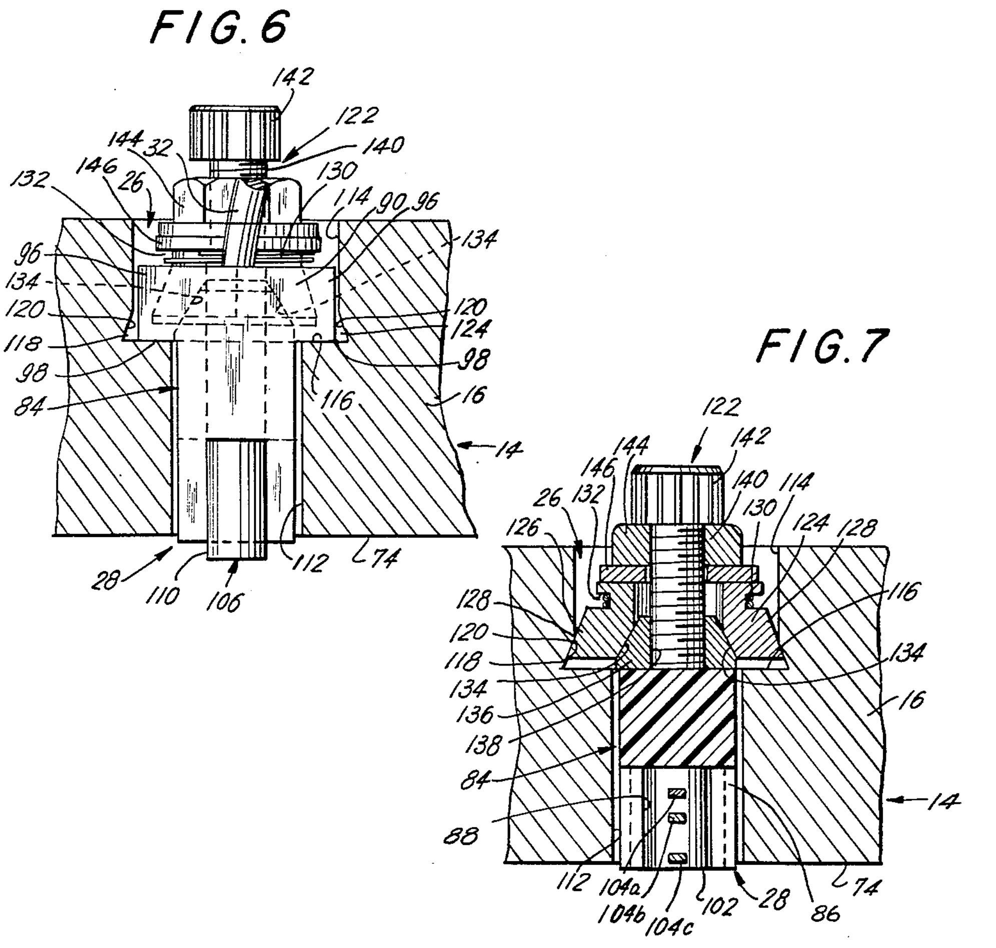
FIG. 6 is a cross sectional view on an enlarged scale taken along the line 6—6 of FIG. 4, the transducing head being shown in end elevation.
FIG. 7 is a view similar to FIG. 6 but with the transducing head cross-sectioned.

The securing means 122 may be entirely separate from the head 28, and it is thus specifically illustrated in FIG. 7, but if desired the screw 140 could be elongated and a suitable internally tapped aperture 150 could be provided in the body portion 86 of the head 28 (as shown in FIG. 5), so that the securing means 122 could be attached to the head 28.

In a typical device of the type under discussion over two hundred individual transducing heads 28 may be employed in conjunction with a magnetic recording surface 72 having 160 tracks thereon and rotated at a speed of 6000 r.p.m. Each head 28 is readily moved into operative position or, when necessary, removed from operative position, all from the exterior of the device. Precise control of the circumferential position of each head is permitted, with each head being readily accessible for individual adjustment without having to disturb any other head. Electrical connection to the heads is greatly facilitated, and the wiring between the heads and the external contacts 10 is neat, uncluttered, and therefore conducive to good maintenance and troubleshooting. If access to the interior of the device is required, one or both of the sections 14 or 14*a* may be removed, without in any way disturbing the adjusted positions of the heads 28 carried thereby or the wiring connected thereto. The spring mounting of the magnetic element 108 in each head 28, which directly cooperates with the corresponding track on the recording medium 30, together with the preferably tangenial orientation of the ledge surfaces 116 along which the heads 28 are movable for longitudinal adjustment, makes the accurate fabrication of the mounting assembly comparatively inexpensive without any sacrifice in the operating characteristics of the device.

While but a single embodiment of the present invention has been here specifically disclosed, it will be apparent that many variations may be made therein, all within the scope of the instant invention as defined in the following claims.

I claim:

1. A transducing assembly comprising a support, a wall mounted thereon and having an aperture therethrough, a recording member movably mounted adjacent said wall and opposite said aperture, said aperture having a support surface and an inclined auxiliary surface associated therewith, a transducing head having a surface engageable with said support surface for supporting said head in said aperture, and wedge means mounted on and carried by said head, movable relative to said heads into wedging engagement with said inclined auxiliary surface, and effective to urge said support surface and said head surface into clamped engagement with one another.

2. The assembly of claim 1, in which said wall is generally cylindrical, and said support surface extends substantially tangentially relative thereto.

3. The assembly of claim 1, in which said auxiliary surface is downwardly and outwardly inclined relative to said support surface, said wedge means having downwardly and outwardly inclined surfaces corresponding to and movable into said wedging engagement with said auxiliary surface.

4. The assembly of claim 3, in which said wall is generally cylindrical, and said support surface extends substantially tangential relative thereto.

5. A transducing assembly comprising a support, a wall mounted thereon and having an aperture therethrough, a recording member movably mounted adjacent said wall and opposite said aperture, said aperture having a narrow section opening onto said recording member and a wider section opening away from said recording member, a ledge being defined between said sections, said ledge terminating laterally in an undercut recess, a transducing head having a first part passing through said narrow aperture section and a wider second part received in said wider aperture section and resting on said ledge, and securing means carried solely by said head, movable into and out of said undercut recess, and effective to secure said head in position in said aperture, said securing means comprising a member movable into and out of said undercut recess, said member having an inside cam surface, a cam carried by said head and active on said cam surface, and a part carried by said head, accessible through said wider aperture section and operatively connected to said cam for actuating it.

6. A transducing assembly comprising a support, a wall mounted thereon and having an aperture therethrough, a recording member movably mounted adjacent said wall and opposite said aperture, said aperture having a narrow section opening onto said recording member and a wider section opening away from said recording member, a ledge being defined between said sections, said ledge terminating laterally in an undercut recess, a transducing head having a first part passing through said narrow aperture section and a wider second part received in said wider aperture section and resting on said ledge, and securing means carried solely by said head, movable into and out of said undercut recess, and effective to secure said head in position in said aperture, said undercut recess having an inclined wedging surface, said securing means comprising a member having a wedging surface engageable with said wedging surface of said recess, said member having an inside cam surface, a cam carried by said head and active on said cam surface, and a part carried by said head, accessible through said wider aperture section and operatively connected to said cam for actuating it.

7. A transducing assembly comprising a support, a wall mounted thereon and having an aperture therethrough, said aperture being elongated in a given direction, a recording member movably mounted adjacent said wall and opposite said aperture, said aperture having a support surface and a downwardly and outwardly inclined auxiliary surface above said support surface, said auxiliary surface extending substantially in said given direction, a transducing head having a surface engageable with said support surface for supporting said head in said aperture, said head being smaller than said aperture in said given direction and being adjustably positionable within said aperture along said given direction, and wedge means mounted on and carried by said head and having a downwardly and outwardly inclined surface corresponding to and wedgingly engageable with said inclined auxiliary surface, said wedge means being movable relative to said head in a direction substantially perpendicular to said given direction, and means on said head for adjustably urging said wedge means against said inclined auxiliary surface, thereby to urge said head surface into clamped engagement with said support surface.

References Cited by the Examiner

UNITED STATES PATENTS

| | | | |
|---|---|---|---|
| 2,862,067 | 11/58 | Christoff | 340—174.1 |
| 2,864,892 | 12/58 | Perkins | 340—174.1 |
| 2,931,691 | 4/60 | Curtis et al. | 340—174.1 |
| 2,998,292 | 8/61 | Lubkin et al. | 340—174.1 |

IRVING L. SRAGOW, *Primary Examiner.*